US012791423B2

(12) United States Patent
Lee et al.

(10) Patent No.: US 12,791,423 B2
(45) Date of Patent: Nov. 10, 2026

(54) STRESS-FREE FOLDING MECHANISM

(71) Applicant: FlexiGO INC., Cheonan-si (KR)

(72) Inventors: Ki Yong Lee, Cheonan-si (KR); Seong Woo Kim, Cheonan-si (KR)

(73) Assignee: FlexiGO INC., Cheonan-si (KR)

( * ) Notice: Subject to any disclaimer, the term of this patent is extended or adjusted under 35 U.S.C. 154(b) by 282 days.

(21) Appl. No.: 18/633,034

(22) Filed: Apr. 11, 2024

(65) Prior Publication Data

US 2024/0361204 A1 Oct. 31, 2024

(30) Foreign Application Priority Data

Apr. 26, 2023 (KR) ........................ 10-2023-0054749

(51) Int. Cl.

| | |
|---|---|
| ***G01M 5/00*** | (2006.01) |
| ***G01B 7/16*** | (2006.01) |
| ***G01N 3/00*** | (2006.01) |
| ***G01N 3/20*** | (2006.01) |
| ***G01N 3/32*** | (2006.01) |
| ***G01N 3/62*** | (2006.01) |
| ***G09F 9/00*** | (2006.01) |

(52) U.S. Cl.
CPC ............... *G01M 5/005* (2013.01); *G01B 7/16* (2013.01); *G01M 5/0025* (2013.01); *G01N 3/00* (2013.01); *G01N 3/20* (2013.01); *G01N 3/32* (2013.01); *G01N 3/62* (2013.01); *G01N 2203/0023* (2013.01); *G09F 9/00* (2013.01)

(58) Field of Classification Search
CPC ...... G01M 5/005; G01M 5/0025; G01N 3/00; G01N 3/20; G01N 3/62; G01N 3/32; G01N 2203/0023; G09F 9/00; G01B 7/16
USPC .............................................................. 73/849
See application file for complete search history.

(56) References Cited

U.S. PATENT DOCUMENTS

| | | | | |
|---|---|---|---|---|
| 5,178,017 | A * | 1/1993 | Dinzburg | G01N 3/20 73/849 |
| 7,426,871 | B2 * | 9/2008 | Saves-Saint-Germes | G01M 5/005 73/818 |
| 7,975,970 | B2 * | 7/2011 | Hu | F16M 11/10 248/447 |
| 10,787,311 | B2 * | 9/2020 | Kim | B65D 88/522 |
| 10,947,766 | B2 * | 3/2021 | Kuyper | A47B 5/04 |
| 12,019,054 | B2 * | 6/2024 | Lee | G01N 3/02 |
| 2008/0066556 | A1 * | 3/2008 | Tan | G01N 3/22 73/761 |
| 2010/0012810 | A1 * | 1/2010 | Hu | F16M 13/00 248/408 |

(Continued)

FOREIGN PATENT DOCUMENTS

| | | | | |
|---|---|---|---|---|
| CN | 113811752 B * | 7/2024 | | G01N 3/02 |
| JP | 6912790 B2 * | 8/2021 | | |

(Continued)

*Primary Examiner* — Stephanie E Bloss
*Assistant Examiner* — Kevin C Butler
(74) *Attorney, Agent, or Firm* — United One Law Group LLC; Kongsik Kim; Jhongwoo Peck

(57) ABSTRACT

A folding mechanism includes a base module and a folding module which is coupled to the base module such that the folding module is capable of being rotated so as to realize a folding operation of a flexible material and which is coupled to the flexible material such that the folding module is capable of being slidably moved.

14 Claims, 15 Drawing Sheets

(56) References Cited

U.S. PATENT DOCUMENTS

| | | | | |
|---|---|---|---|---|
| 2012/0085178 | A1* | 4/2012 | Chiang | G01N 3/20 73/826 |
| 2019/0242799 | A1* | 8/2019 | Kuroda | G01N 3/04 |
| 2022/0042891 | A1* | 2/2022 | Lee | G01N 3/20 |
| 2023/0236098 | A1* | 7/2023 | Lee | G01N 3/20 |

FOREIGN PATENT DOCUMENTS

| | | | | | |
|---|---|---|---|---|---|
| JP | 2022533601 | A | * | 7/2022 | G01N 3/02 |
| KR | 102255147 | B1 | * | 5/2021 | G01N 3/20 |
| KR | 10-2021-0138183 | A | | 11/2021 | |
| KR | 20210138183 | A | * | 11/2021 | G01N 3/32 |
| KR | 102348742 | B1 | * | 1/2022 | G01N 3/20 |
| KR | 102667174 | B1 | * | 5/2024 | G06F 1/1616 |

* cited by examiner

STRESS-FREE FOLDING MECHANISM

CROSS REFERENCE TO RELATED APPLICATION

The present application claims priority from Korean Patent Application No. 10-2023-0054749 filed Apr. 26, 2023, which is incorporated herein by reference in its entirety.

BACKGROUND

1. Technical Field

The present disclosure relates to a stress-free folding mechanism, the folding mechanism being capable of minimizing stress acting on a flexible material that is folded or being capable of preventing stress from acting on the flexible material that is folded while a folding durability test of the flexible material is performed.

2. Description of the Related Art

Generally, a conventional display panel used for a display of a television, a computer monitor, or for various portable electronic devices uses an inflexible glass substrate and has a flat structure, and thus is monotonous and is limited in application.

For this reason, instead of the inflexible glass substrate, due to the recent development of science and technology, flexible display devices which are made of a flexible material such as plastic and are bendable have been developed and produced. For example, the technology of manufacturing a flexible display panel that can be folded or rolled up like a scroll has also been developed.

As such, since a product in which a flexible display is folded is released, a technology that minimizes stress acting on the flexible display that is folded or a technology that prevents stress from being applied to the flexible display that is folded when a folding durability test of the flexible display is performed is required.

SUMMARY

Accordingly, the present disclosure has been made keeping in mind the above problems occurring in the related art, and an objective of the present disclosure is to provide a stress-free folding mechanism, the folding mechanism being capable of minimizing stress acting on a flexible material that is folded or being capable of preventing stress from acting on the flexible material that is folded while a folding durability test of the flexible material is performed.

In the folding mechanism according to an exemplary embodiment of the present disclosure, the folding mechanism includes: a base module; and a folding module which is coupled to the base module such that the folding module is capable of being rotated so as to realize a folding operation of a flexible material and to which the flexible material is coupled.

Therefore, the folding operation of the flexible material may be clearly realized.

Here, the folding module may include: a folding body coupled to the base module such that the folding body is capable of being rotated; a first interlocking slider coupled to the folding body via a first interlocking member such that the first interlocking slider is capable of being slidably moved; and a second interlocking slider coupled to the first interlocking slider via a second interlocking member such that the second interlocking slider is capable of being slidably moved.

Therefore, when the folding operation of the flexible material is implemented, the folding operation is performed in a double sliding manner, and stress on the flexible material may be minimized.

Here, the first interlocking slider may include: an inclined panel disposed to be inclined with respect to the folding body and coupled to the second interlocking slider via the second interlocking member such that the inclined panel is capable of being slidably moved; and a horizontal panel which extends from the inclined panel and which is disposed parallel to the folding body, the horizontal panel being coupled to the folding body via the first interlocking member such that the horizontal panel is capable of being slidably moved. Furthermore, the second interlocking slider may be provided with an inclined support portion disposed parallel to the inclined panel.

Therefore, when the flexible material is folded, a horizontal sliding method and an inclined sliding method are simultaneously used, so that an error between a movement trajectory of the flexible material and a movement trajectory of the second interlocking slider may be corrected and stress may be prevented from occurring on the flexible material.

Here, the first interlocking slider may include: an inclined panel disposed to be inclined with respect to the second interlocking slider and coupled to the folding body via the second interlocking member such that the inclined panel is capable of being slidably moved; and a horizontal panel which extends from the inclined panel and which is disposed parallel to the second interlocking slider, the horizontal panel being coupled to the second interlocking slider via the first interlocking member such that the horizontal panel is capable of being slidably moved. Furthermore, the folding body may be provided with an inclined support portion disposed parallel to the inclined panel.

Therefore, when the flexible material is folded, a horizontal sliding method and an inclined sliding method are simultaneously used, so that an error between a movement trajectory of the flexible material and a movement trajectory of the second interlocking slider may be corrected and stress may be prevented from occurring on the flexible material.

In the folding mechanism according to an exemplary embodiment of the present disclosure, the folding mechanism may further include a jig module coupled to the folding module while the jig module is in a state in which the jig module is coupled to the base module such that the flexible material is mounted.

Therefore, mounting of the flexible material may be smoothly performed, and the folding operation of the flexible material may be clearly realized.

In the folding mechanism according to an exemplary embodiment of the present disclosure, the folding mechanism may further include a jig attaching and detaching module configured to couple the jig module to the base module such that the jig module is capable of being attached to and detached from the base module.

Therefore, the jig module may be variously replaced according to the type of flexible material or the type of test.

Here, the jig attaching and detaching module may include: a base attaching and detaching member coupled and fixed to the base module; and a jig attaching and detaching member which protrudes on the jig module and which is coupled to the base attaching and detaching member such that the jig attaching and detaching member is capable of being attached to and detached from the base attaching and detaching member.

Therefore, the jig module may be conveniently attached to and detached from the base module.

Here, the base attaching and detaching member may include: a base support block coupled and fixed to the base module; and a base attaching and detaching block coupled and fixed to the base support block. The base attaching and detaching block may be provided with a locking flow space, a main passage hole may be formed through a middle portion of the base attaching and detaching block such that the locking flow space is in communication with an outside of the base attaching and detaching block, and a locking passage hole may be recessed from an edge of the main passage hole such that the locking flow space is in communication with the outside of the base attaching and detaching block. The jig attaching and detaching member may include: a jig support block that protrudes on the jig module; and a jig attaching and detaching block coupled to the jig support block such that the jig attaching and detaching block is capable of being rotated and is capable of being attached to and detached from the base attaching and detaching block. The jig attaching and detaching block may include: an attaching and detaching base coupled and fixed to the jig support block corresponding to the base attaching and detaching block; a main shaft coupled to the attaching and detaching base and the jig support block such that the main shaft is capable of being rotated and is capable of passing through the main passage hole; a locking shaft that protrudes on the main shaft such that the locking shaft is capable of passing through the locking passage hole; and an attaching and detaching lever coupled to the attaching and detaching base such that the attaching and detaching lever is capable of being rotated, the attaching and detaching lever being configured to rotate the main shaft such that the locking shaft is capable of being locked on the base attaching and detaching block in the locking flow space.

Therefore, as the forward rotation of the attaching and detaching lever is performed, a state in which the locking shaft is locked on and coupled to the base attaching and detaching block is stably maintained. Furthermore, as the reverse rotation of the attaching and detaching lever is performed so as to return the attaching and detaching lever to an original position, the jig attaching and detaching member is capable of being conveniently separated from the base attaching and detaching member.

Here, a base support protrusion portion may protrude on any one of the base support block and the jig support block, and a protrusion fitting portion coupled to the base support protrusion portion may be formed in the other one of the base support block and the jig support block.

Therefore, the correct position of the jig attaching and detaching member in the base attaching and detaching member may be clarified.

Here, the jig module may include: a fixing member coupled to the base module such that a first side of the flexible material is supported; a folding member spaced apart from the fixing member and coupled to the folding module such that a second side of the flexible material is supported; and a rotation support member configured to couple an end portion of the fixing member to an end portion of the folding member, the end portions being adjacent to each other.

Therefore, the jig module may be stably coupled to the base module and the folding module, the folding operation of the flexible material may be clearly realized according to the operation of the folding module, and stress may be suppressed or prevented from being applied to the flexible material.

Here, the fixing member may include: a fixing base; a sliding base coupled to the fixing base via a base interlocking member such that the sliding base is capable of being slidably moved.

Therefore, various types of flexible materials may be coupled to a single jig module by slidably moving the sliding base on the fixing base according to a length of the flexible material.

Here, the fixing member may further include a position adjustment member configured to fix the sliding base to the fixing base such that the sliding base is disposed in a correct position.

As a result, the sliding base may be conveniently disposed on a correct position in the fixing base.

Here, the position adjustment member may include: an adjustment guide disposed adjacent to a side end portion of the sliding base and provided on the fixing base such that the adjustment guide is disposed parallel to the sliding base; an adjustment slider coupled to the adjustment guide such that the adjustment slider is capable of being attached to and detached from the adjustment guide according to a position of the sliding base; and an adjustment coupling member configured to couple the adjustment slider to the side end portion of the sliding base such that the adjustment slider is capable of being attached to and detached from the side end portion of the sliding base.

Therefore, the coupling between the fixing base and the sliding base may be clarified according to a sliding position of the sliding base. In addition, since a position determination portion is provided, a coupling position of the adjustment slider may be clarified. In addition, since a position checking member is provided, a position at which the sliding base is slidably moved on the fixing base may be visually and easily identified.

Here, the rotation support member may include: a first axis that forms a rotation center of the rotation support member with respect to the fixing member; and a second axis which is spaced apart from the first axis and which forms a rotation center of the folding member with respect to the rotation support member. Furthermore, the rotation support member may be configured to be rotated with respect to the fixing member in conjunction with a rotation of the folding member with respect to the rotation support member when the folding member is folded with respect to the fixing member.

Therefore, a linkage operation of the fixing member, the folding member, and the rotation support member is smoothly performed, and stress acting on the flexible material may be suppressed or prevented as the fixing member, the folding member, and the rotation support member are rotated in conjunction with each other.

Here, the rotation support member may include: a mounting bracket disposed between the fixing member and the folding member; a fixing support member coupled to the fixing member and coupled to the mounting bracket via the first axis such that the fixing support member is capable of being rotated; and a folding support member coupled to the folding member and coupled to the mounting bracket via the second axis such that the folding support member is capable of being rotated. Furthermore, the fixing support member and the folding support member may be gear-engaged with each other.

Therefore, the rotation of the mounting bracket, the fixing support member, and the folding support member in conjunction with each other is clearly defined, and stress may be suppressed or prevented from being applied to the flexible material when the flexible material is folded.

According to the present disclosure, a stress-free folding mechanism may be realized, the folding mechanism being capable of minimizing stress acting on a flexible material that is folded or being capable of preventing stress from acting on the flexible material that is folded while a folding durability test of the flexible material is performed.

In addition, in the present disclosure, the folding operation of the flexible material may be clearly realized.

In addition, in the present disclosure, when the folding operation of the flexible material is implemented, the folding operation is performed in the double sliding manner, and stress on the flexible material may be minimized.

In addition, in the present disclosure, when the flexible material is folded, the horizontal sliding method and the inclined sliding method are simultaneously used, so that an error between a movement trajectory of the flexible material and a movement trajectory of the second interlocking slider may be corrected and stress may be prevented from occurring on the flexible material.

In addition, in the present disclosure, mounting of the flexible material may be smoothly performed, and the folding operation of the flexible material may be clearly realized.

In addition, in the present disclosure, the jig module may be variously replaced according to the type of flexible material or the type of test.

In addition, in the present disclosure, the jig module may be conveniently attached to and detached from the base module.

In addition, in the present disclosure, as the forward rotation of the attaching and detaching lever is performed, a state in which the locking shaft is locked on and coupled to the base attaching and detaching block is stably maintained. Furthermore, as the reverse rotation of the attaching and detaching lever is performed so as to return the attaching and detaching lever to an original position, the jig attaching and detaching member is capable of being conveniently separated from the base attaching and detaching member.

In addition, in the present disclosure, the correct position of the jig attaching and detaching member in the base attaching and detaching member may be clarified.

In addition, in the present disclosure, the jig module may be stably coupled to the base module and the folding module, the folding operation of the flexible material may be clearly realized according to the operation of the folding module, and stress may be suppressed or prevented from being applied to the flexible material.

In addition, in the present disclosure, various types of flexible materials may be coupled to a single jig module by slidably moving the sliding base on the fixing base according to a length of the flexible material.

In addition, in the present disclosure, a correct position of the sliding base in the fixing base may be conveniently fixed.

In addition, in the present disclosure, the coupling between the fixing base and the sliding base may be clarified according to a sliding position of the sliding base. In addition, since the position determination portion is provided, a coupling position of the adjustment slider may be clarified. In addition, since the position checking member is provided, a position at which the sliding base is slidably moved on the fixing base may be visually and easily identified.

In addition, in the present disclosure, a linkage operation of the fixing member, the folding member, and the rotation support member is smoothly performed, and stress acting on the flexible material may be suppressed or prevented as the fixing member, the folding member, and the rotation support member are rotated in conjunction with each other.

In addition, in the present disclosure, the rotation of the mounting bracket, the fixing support member, and the folding support member in conjunction with each other is clearly defined, and stress may be suppressed or prevented from being applied to the flexible material when the flexible material is folded.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
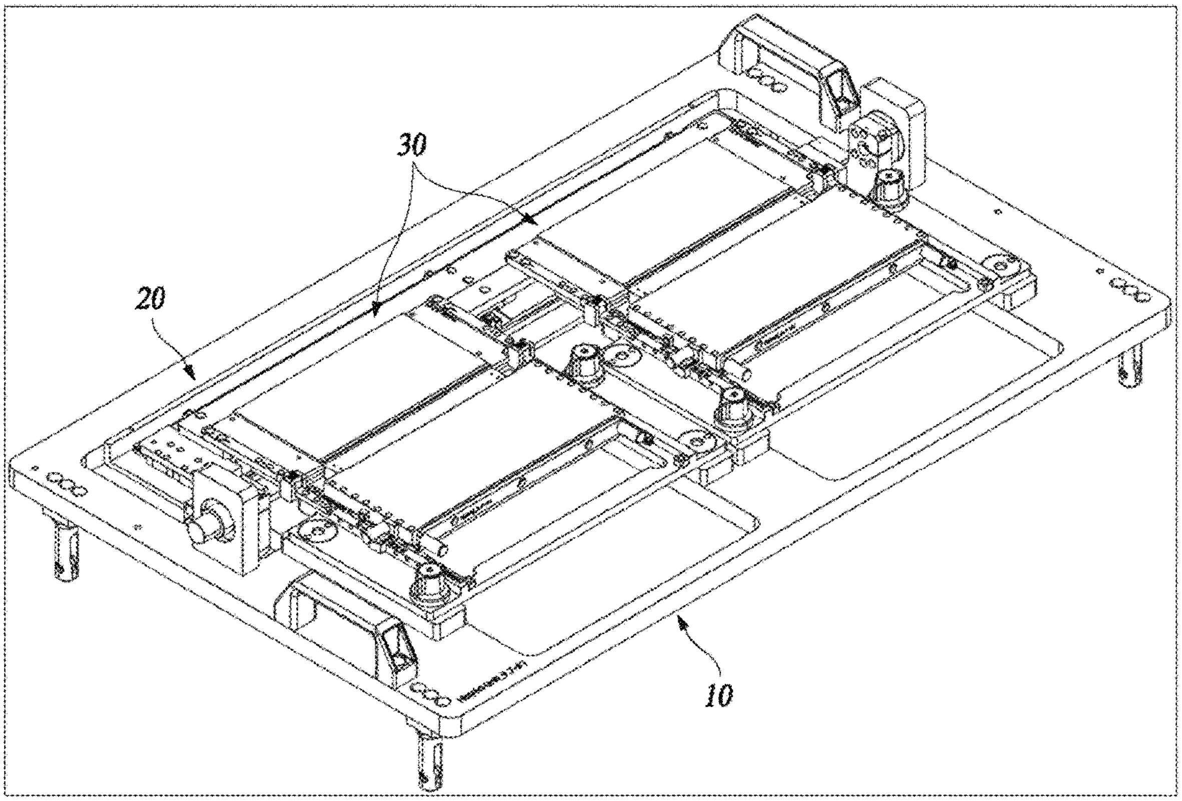
FIG. 1 is a perspective view illustrating a folding mechanism according to an embodiment of the present disclosure.
Figure 2:
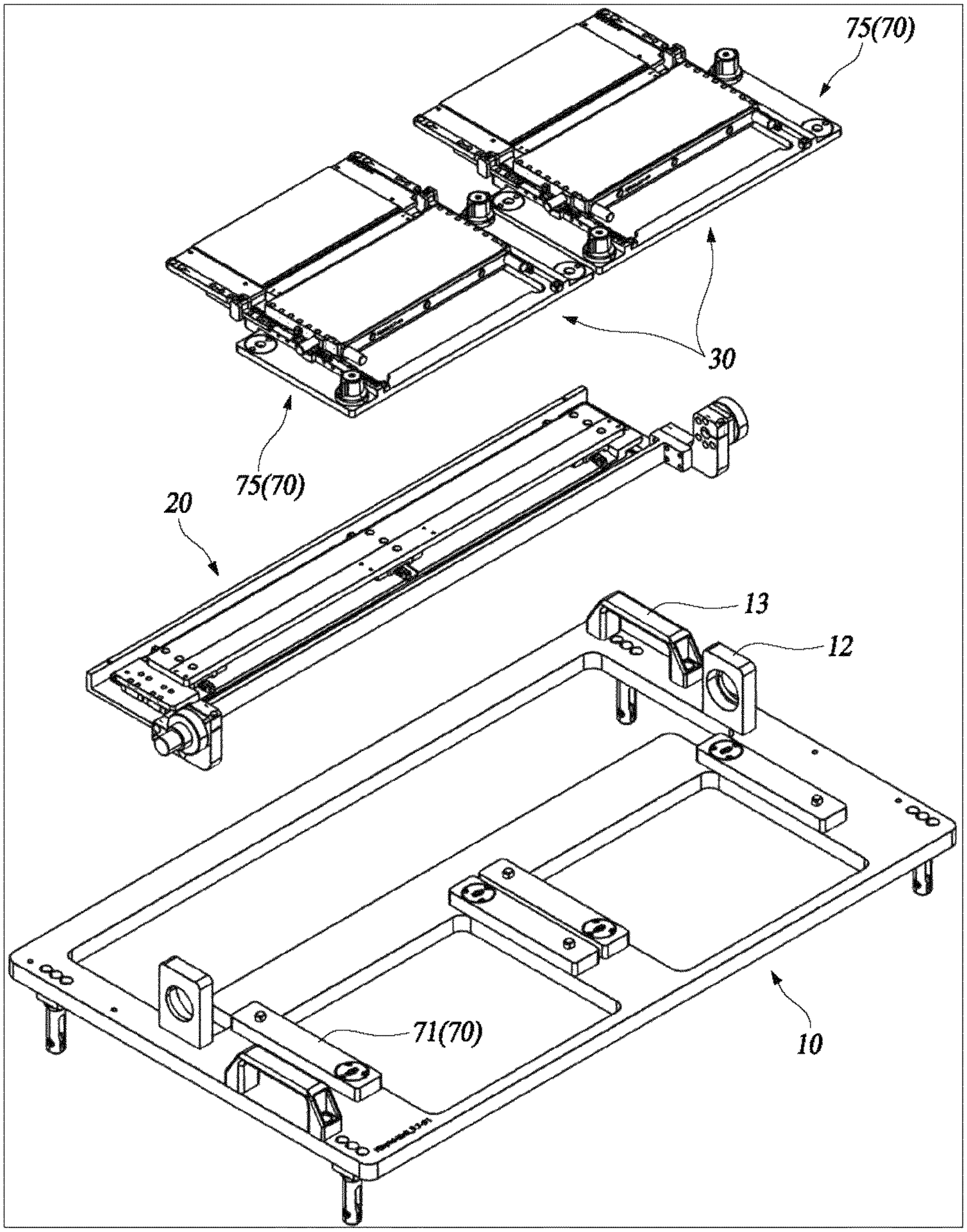
FIG. 2 is an exploded perspective view of FIG. 1.

The above and other objectives, features, and advantages of the present disclosure will be more clearly understood from the embodiments below when taken in conjunction with the accompanying drawings. However, the present disclosure is not limited to the embodiments described herein and may be embodied in other forms. The embodiments described herein are presented to form a complete disclosure of the present disclosure and to help those of ordinary skill in the art best understand the disclosure.

It will be understood that when an element is referred to as being on another element, the element can be directly on another element or intervening elements may be present. In addition, in the drawings, thicknesses of elements are exaggerated for effective description of the technical details.

If the terms such as first and second are used to describe elements, these elements should not be limited by such terms. These terms are used for the purpose of distinguishing one element from another element. The exemplary embodiments include their complementary embodiments.

Also, it will be understood that when a first element (or first component) is referred to as being operated or executed on a second element (or second component), the first element (or first component) can be operated or executed in an environment where the second element (second component) is operated or executed or can be operated or executed by interacting with the second element (second component) directly or indirectly.

Also, it will be understood that when an element, a component, apparatus, or a system is referred to as including a component consisting of a program or software, the element, the component, the apparatus, or the system can include hardware (for example, a memory or a central processing unit (CPU)) necessary for executing or operating the program, software, another program, or another software (for example, an operating system (OS) or a driver necessary for driving a hardware), unless the context clearly indicates otherwise.

Also, it will be understood that an element (or component) can be realized by software, hardware, or software and a hardware, unless the context clearly indicates otherwise.

The terms used herein are for the purpose of describing particular exemplary embodiments only and are not intended to limit the scope of the present disclosure. As used herein, the singular forms are intended to include the plural forms as well, unless the context clearly indicates otherwise. It will be further understood that the terms 'comprises' and/or 'comprising' used herein do not preclude the presence or addition of one or more other components.

Referring to FIGS. 1 to 15, a folding mechanism according to an embodiment of the present disclosure may include a base module 10 and a folding module 20.

The base module 10 is coupled to a system body provided in a folding system that performs a folding test of a flexible material. A first side of the flexible material is coupled to the base module 10 via a fixing member 40 that will be described later. The fixing member 40 that will be described later is coupled to the base module 10 via a jig attaching and detaching module 70 that will be described later such that the fixing member 40 is capable of being attached to and detached from the base module 10.

Figure 3:
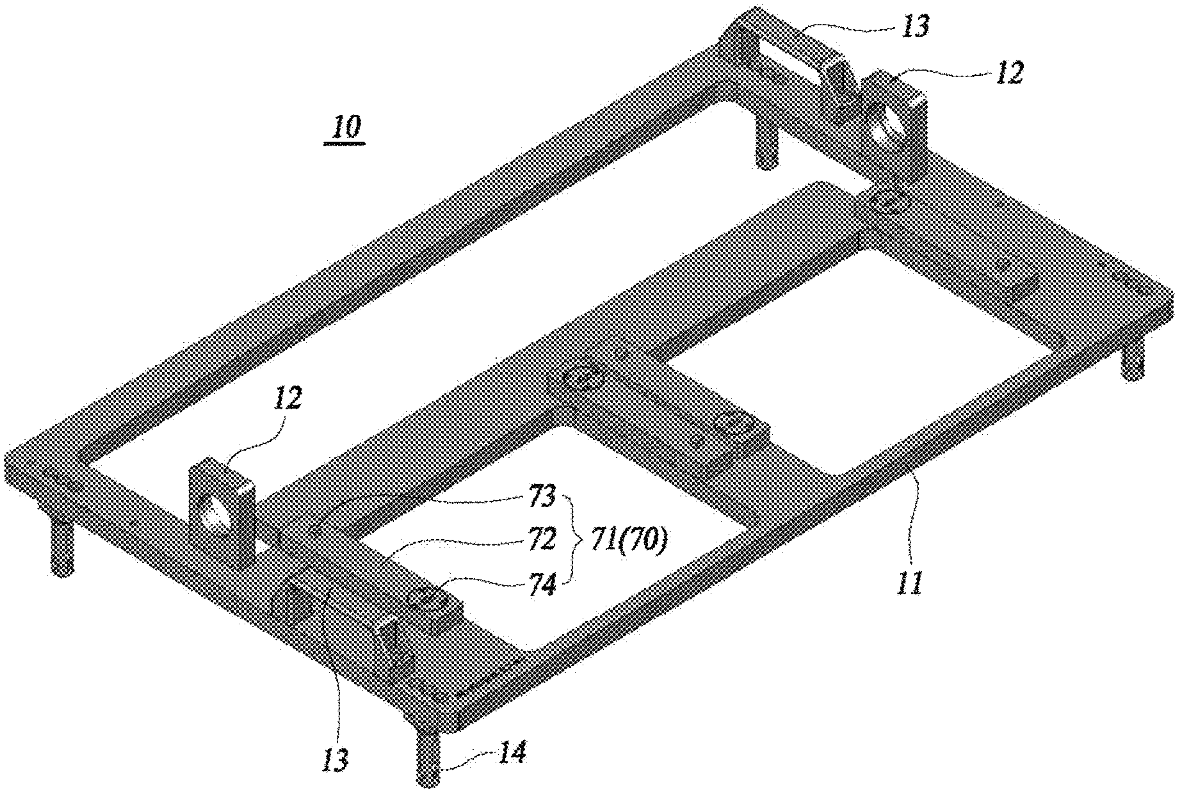
FIG. 3 is a perspective view illustrating a base module in the folding mechanism according to an embodiment of the present disclosure.

As illustrated in FIG. 3, the base module 10 may include a base body 11 having a plate shape, and may include a folding support bracket 12 that protrudes on the base body 11 so that the folding module 20 is coupled to the base module 10 such that the folding module 20 is capable of being rotated. A body opening is formed through the base body 11, so that ventilation and heat dissipation according to an operation of the folding mechanism are smoothly performed and a load of the base body 11 may be minimized. The folding support bracket 12 is provided on the base body 11 such that a pair of folding support brackets 12 faces each other by being spaced apart from each other.

In addition, the base module 10 may further include at least one of: a holding member 13 held by a user; and a base coupling member 14 that protrudes from the base body 11 so as to be coupled to the system body.

The folding module 20 is coupled to the base module 10 such that the folding module 20 is capable of being rotated so as to realize a folding operation of the flexible material. A second side of the flexible member is coupled to the folding module 20 via a folding member 50 of a jig module 30 to be described later. The folding member 50 that will be described later is coupled to the folding module 20, and is capable of being slidably moved on the folding module 20 according to an operation of the folding module 20.

As illustrated in FIGS. 5 to 8, the folding module 20 may include a folding body 21 coupled to the base module 10 such that the folding body 21 is capable of being rotated, a first interlocking slider 22 coupled to the folding body 21 via a first interlocking member 24 such that the first interlocking slider 22 is capable of being slidably moved, and a second interlocking slider 23 coupled to the first interlocking slider 22 via a second interlocking member 25 such that the second interlocking slider 23 is capable of being slidably moved.

The folding body 21 may include a folding base 211 on which the first interlocking slider 22 is stacked, a folding bracket 212 coupled to both side ends of the folding base 211 in a '⌉' shape, and a folding shaft 213 coupled to a free end portion of the folding bracket 212 and coupled to the folding support bracket 12 of the base module 10 such that the folding shaft 213 is capable of being rotated.

As an example, as illustrated in the drawings, the first interlocking slider 22 may include an inclined panel 221 which is disposed to be inclined with respect to the folding body 21 and which is coupled to the second interlocking slider 23 via the second interlocking member 25 such that the inclined panel 221 is capable of being slidably moved, and may include a horizontal panel 222 which extends from the inclined panel 221 such that the horizontal panel 222 is disposed parallel to the folding body 21 and which is coupled to the folding body 21 via the first interlocking member 24 such that the horizontal panel 222 is capable of being slidably moved. At this time, as illustrated in the drawings, it is preferable that the second interlocking slider 23 is provided with an inclined support portion disposed parallel to the inclined panel 221. The inclined support portion is inclined upward from a rotation center side of the folding module 20 toward an end portion side of the folding module 20 on the basis of an initial state in which the flexible material is disposed flat, so that a folding operation of the jig module 30 may be clearly realized. Here, the inclination of the inclined panel 221 or the inclined support portion is not limited.

In addition, the first interlocking member 24 may include a first slider 241 provided on any one of the folding body 21 and the horizontal panel 222, and may include a first guide 242 provided on the other one of the folding body 21 and the horizontal panel 222 so that the first slider 241 is coupled such that the first slider 241 is capable of being slidably moved. In addition, the second interlocking member 25 may include a second slider 251 provided on any one of the inclined panel 221 and the inclined support portion of the second interlocking slider 23, and may include a second guide 252 provided on the other one of the inclined panel 221 and the inclined support portion of the second interlocking slider 23 so that the second slider 251 is coupled such that the second slider 251 is capable of being slidably moved.

Then, according to the folding operation of the flexible material, the horizontal panel 222 of the first interlocking slider 22 is slidably moved parallel to the folding body 21, and the second interlocking slider 23 is slidably moved parallel to the inclined panel 221 of the first interlocking slider 22. Therefore, the first interlocking slider 22 is slidably moved parallel to the folding body 21, and the second interlocking slider 23 is slidably and obliquely moved on the folding body 21, so that the folding operation of the jig module 30 may be clearly realized.

As another example, although not illustrated in the drawings, the first interlocking slider 22 may include the inclined panel 221 which is disposed to be inclined with respect to the second interlocking slider 23 and which is coupled to the folding body 21 via the second interlocking member 25 such that the inclined panel 221 is capable of being slidably moved, and may include the horizontal panel 222 which extends from the inclined panel 221 such that the horizontal panel 222 is disposed parallel to the second interlocking slider 23 and which is coupled to the second interlocking slider 23 via the first interlocking member 24 such that the horizontal panel 222 is capable of being slidably moved. At this time, it is preferable that the folding body 21 is provided with the inclined support portion disposed parallel to the inclined panel 221. As described above, the inclined support portion is inclined upward from the rotation center side of the folding module 20 toward the end portion side of the folding module 20 on the basis of the initial state in which the flexible material is disposed flat, so that the folding operation of the jig module 30 may be clearly realized. Here, the inclination of the inclined panel 221 or the inclined support portion is not limited.

In addition, the first interlocking member 24 may include the first slider 241 provided on any one of the inclined support portion of the folding body 21 and the inclined panel 221, and may include the first guide 242 provided on the other one of the inclined support portion of the folding body 21 and the inclined panel 221 so that the first slider 241 is coupled such that the first slider 241 is capable of being slidably moved. In addition, the second interlocking member 25 may include the second slider 251 provided on any one of the inclined panel 222 and the second interlocking slider 23, and may include the second guide 252 provided on the other one of the inclined panel 222 and the second interlocking slider 23 so that the second slider 251 is coupled such that the second slider 251 is capable of being slidably moved.

Then, according to the folding operation of the flexible material, the inclined panel 221 of the first interlocking slider 22 is slidably moved parallel to the inclined support portion of the folding body 21, and the second interlocking slider 23 is slidably moved parallel to the inclined panel 222 of the first interlocking slider 22. Therefore, the first interlocking slider 22 is slidably and obliquely moved on the folding body 21, and the second interlocking slider 23 is slidably moved parallel to the folding body 21, so that the folding operation of the jig module 30 may be clearly realized.

The folding mechanism according to an embodiment of the present disclosure may further include the jig module 30. The jig module 30 is coupled to the folding module 20 while the jig module 30 is coupled to the base module 10 so that the flexible material is mounted.

Figure 9:
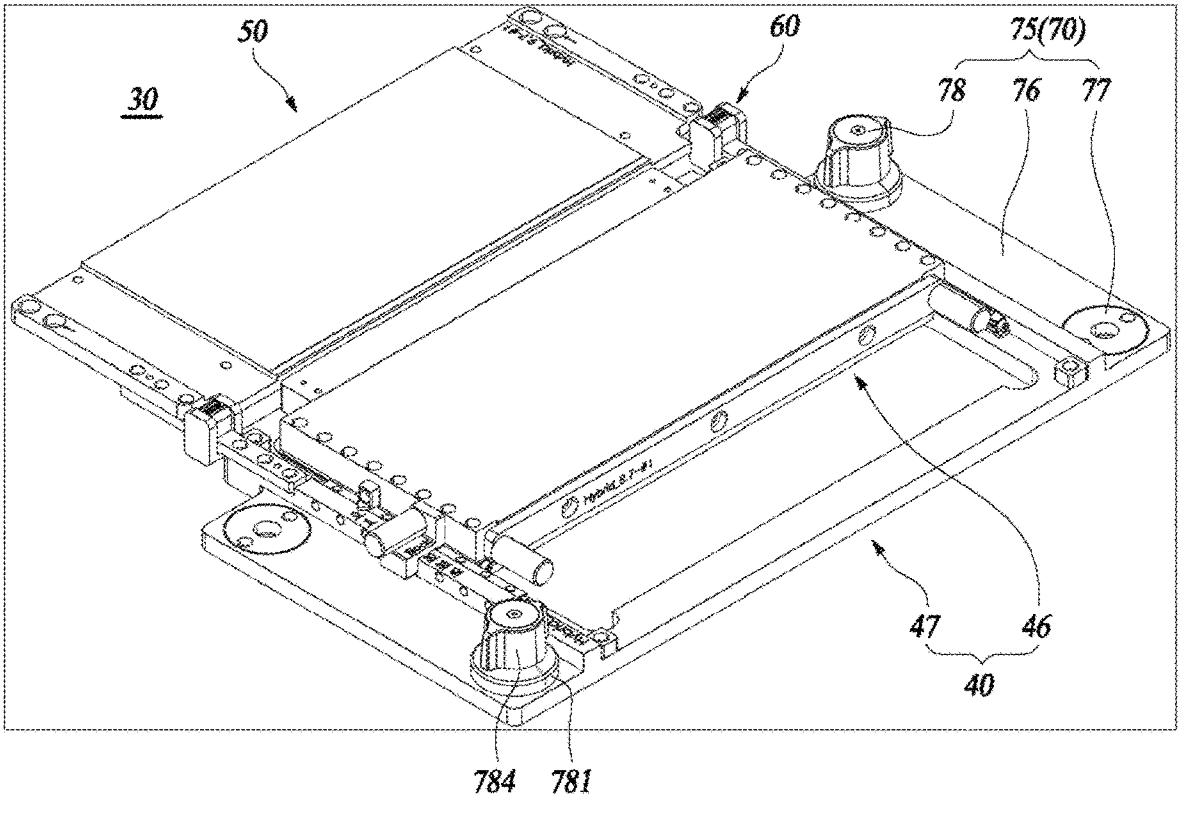
FIG. 9 is a perspective view illustrating the jig module in the folding mechanism according to an embodiment of the present disclosure.
Figure 10:
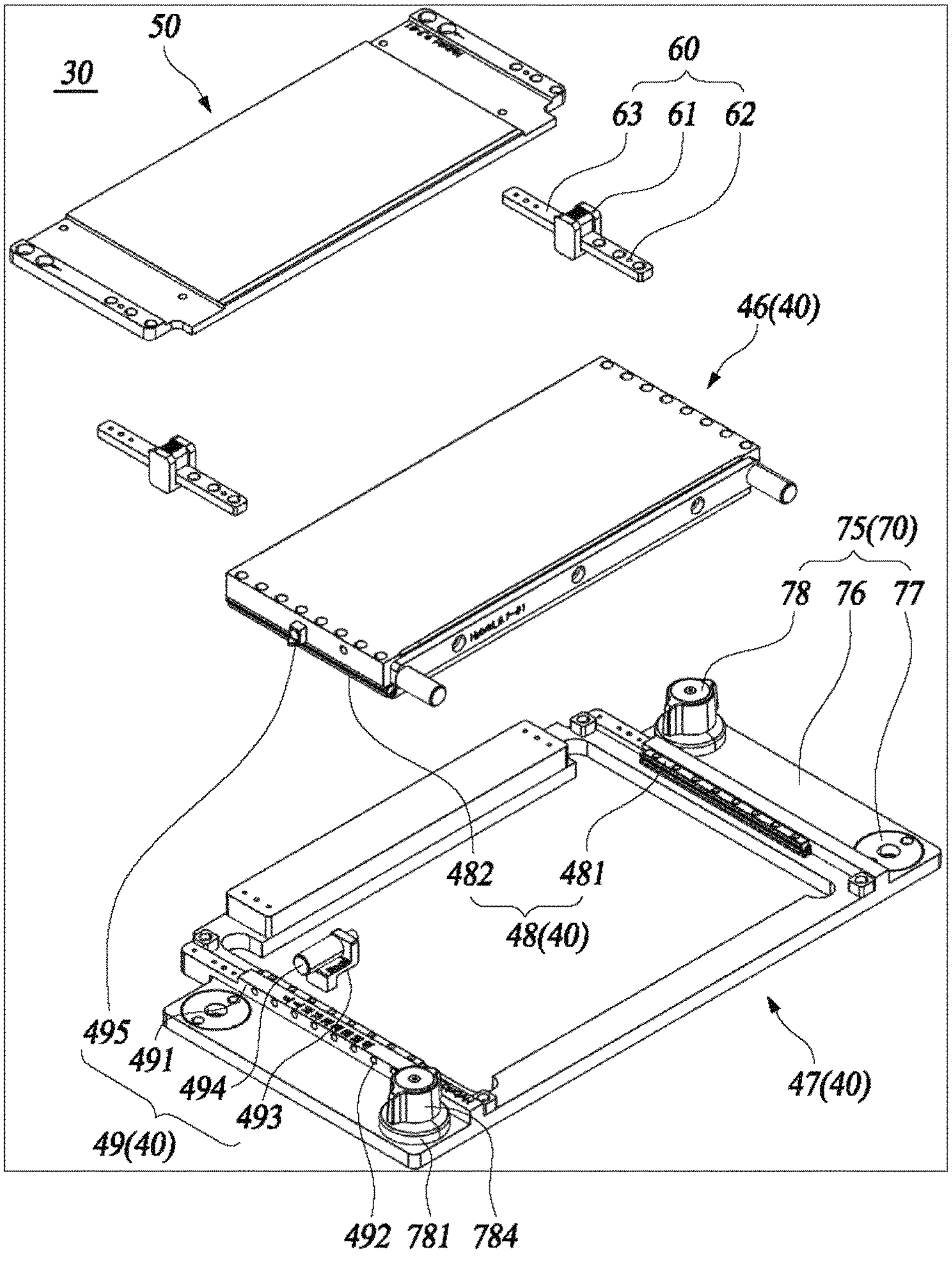
FIG. 10 is an exploded perspective view of FIG. 9.

As illustrated in FIG. 9 and FIG. 10, the jig module 30 may include the fixing member 40 on which the first side of the flexible member is supported, the folding member 50 which is disposed to be spaced apart from the fixing member 40 and on which the second side of the flexible material is supported, and a rotation support member 60 configured to couple an end portion of the fixing member 40 to an end portion of the folding member 50, the end portions being adjacent to each other.

The fixing member 40 is coupled to the base module 10 via the jig attaching and detaching module 70 that will be described later such that the fixing member 40 is capable of being attached to and detached from the base module 10, and the folding member 50 is coupled to the folding module 20.

More specifically, the fixing member 40 may include a fixing base 47, and may include a sliding base 46 coupled to the fixing base 47 via a base interlocking member 48 such that the sliding base 46 is capable of being slidably moved.

A fixing opening is formed through the fixing base 47, so that ventilation and heat dissipation according to the operation of the folding mechanism are smoothly performed and a load of the fixing base 47 may be minimized.

The base interlocking member 48 may include a base guide 481 provided on any one of the fixing base 47 and the sliding base 46, and may include a base slider 482 provided on the other one of the fixing base 47 and the sliding base 46 so that the base slider 482 is coupled such that the base slider 482 is capable of being slidably moved.

The fixing member 40 may further include a position adjustment member 49 that fixes the sliding base 46 to the fixing base 47 in a position.

The position adjustment member 49 may include an adjustment guide 491 disposed adjacent to a side end portion of the sliding base 46 and provided on the fixing base 47 such that the adjustment guide 491 is disposed parallel to the sliding base 46, an adjustment slider 493 coupled to the adjustment guide 491 such that the adjustment slider 493 is capable of being attached to and detached from the adjustment guide 491 according to a position of the sliding base 46, and an adjustment coupling member 494 configured to couple the adjustment slider 493 to the side end portion of the sliding base 46 such that the adjustment slider 493 is capable of being attached to and detached from the side end portion of the sliding base 46.

Here, at least two position determination portions 492 are disposed on a side surface portion of the adjustment guide 491 while being in a state in which the two position determination portions 492 are spaced apart from each other. Therefore, when a position of the sliding base 46 is determined, an adjustment determination portion provided on the adjustment slider 493 is coupled to any one of the two position determination portions 492 such that the adjustment determination portion is capable of being attached to and detached from any one of the two position determination portions 492, and the adjustment coupling member 494 couples the adjustment slider 493 to the sliding base 46 such that the adjustment slider 493 is capable of being attached to and detached from the sliding base 46.

In addition, since a scale is indicated on the adjustment guide 491 and the position adjustment member 49 further includes a position checking member 495 coupled to the side end portion of the sliding base 46, a distance at which the sliding base 46 is slidably moved on the fixed base 47 is capable of being easily checked.

The folding member 50 has a plate shape, and is stacked and coupled parallel to the second interlocking slider 23 of the folding module 20.

The rotation support member 60 includes a first shaft that forms a rotation center of the rotation support member 60 with respect to the fixing member 40, and includes a second shaft which is spaced apart from the first shaft and which forms a rotation center of the folding member 50 with respect to the rotation support member 60. The first and second shafts are spaced apart from each other. Accordingly, when the folding member 50 is folded with respect to the fixing member 40, it is preferable that the rotation support member 60 is rotated with respect to the fixing member 40 in conjunction with the rotation of the folding member 50 that is rotated with respect to the rotation support member 60.

Figure 11:
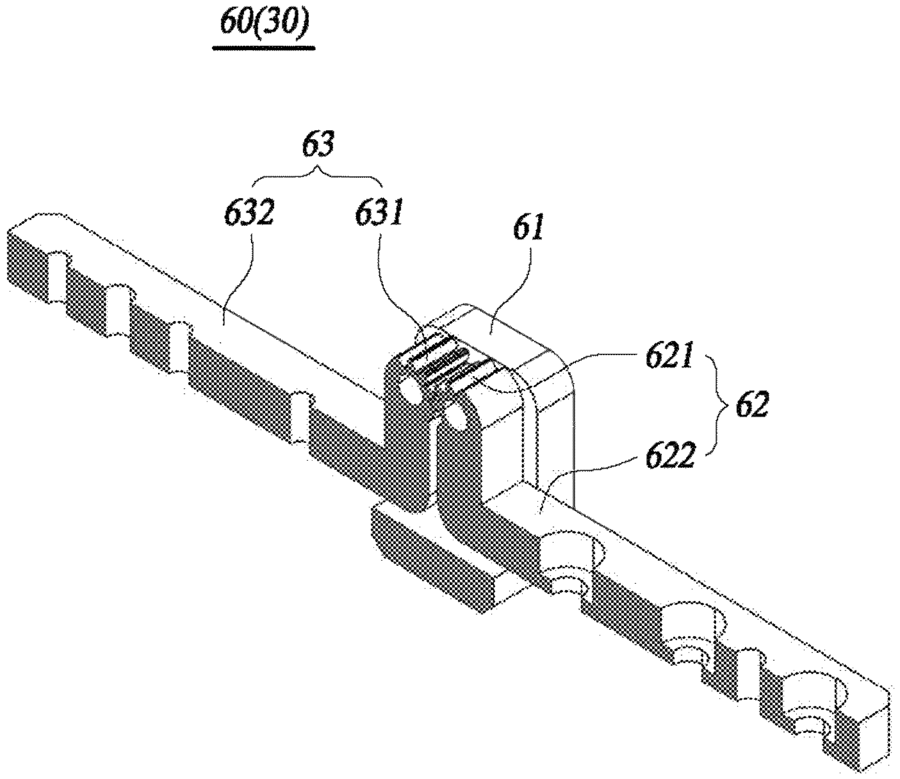
FIG. 11 is a cross-sectional view illustrating a rotation support member of the jig module in the folding mechanism according to an embodiment of the present disclosure.
Figure 12:
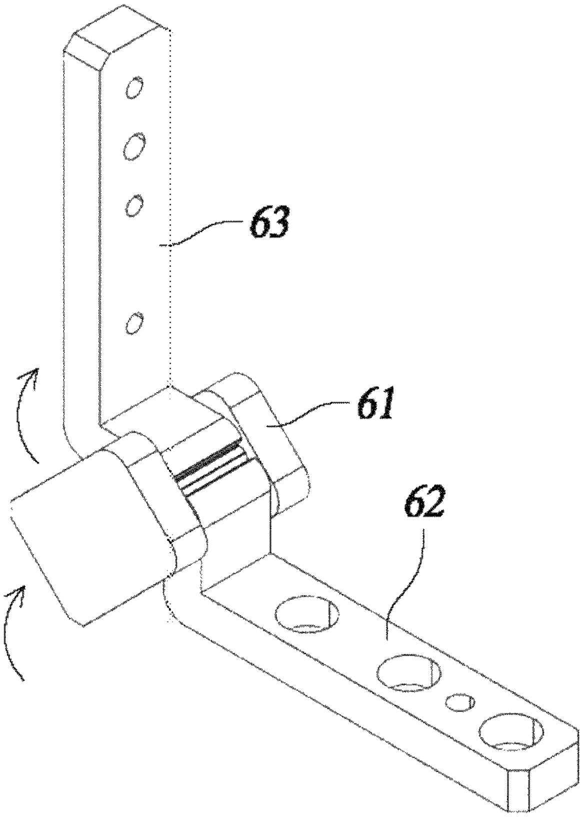
FIG. 12 is a perspective view illustrating a state in which the rotation support member of the jig module is folded at 90 degrees in the folding mechanism according to an embodiment of the present disclosure.
Figure 13:
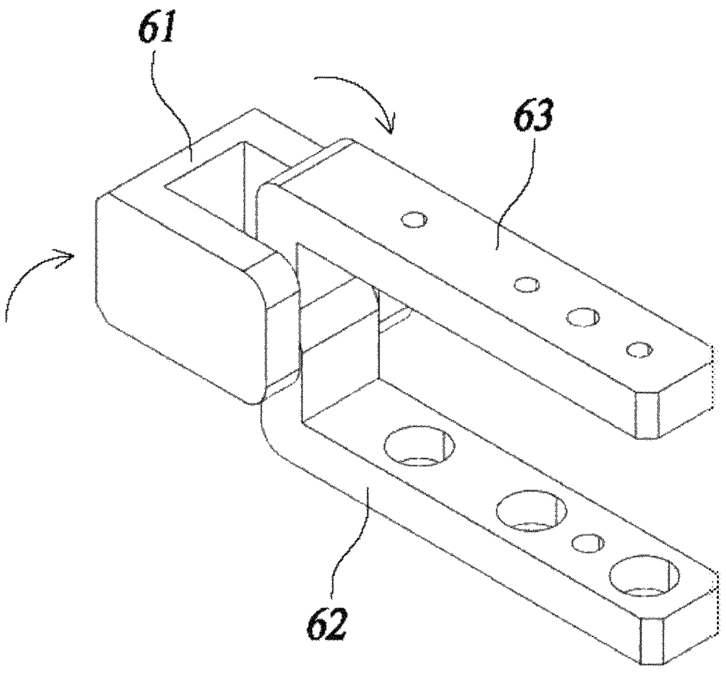
FIG. 13 is a perspective view illustrating a state in which the rotation support member of the jig module is folded at zero degrees in the folding mechanism according to an embodiment of the present disclosure.

More specifically, as illustrated in FIGS. 11 to 13, the rotation support member 60 may include a mounting bracket 61 disposed between the fixing member 40 and the folding member 50, a fixing support member 62 coupled to the fixing member 40 and coupled to the mounting bracket 61 via the first shaft such that the fixing support member 62 is capable of being rotated, and a folding support member 63 coupled to the folding member 50 and coupled to the mounting bracket 61 via the second shaft such that the folding support member 63 is capable of being rotated. At this time, it is preferable that the fixing support member 62 and the folding support member 63 are gear-coupled to each other.

Since the mounting bracket 61 has a channel shape having a cross-sectional shape of a '⊏' shape, the folding operation of the flexible member is capable of being realized by performing a rotation from a 180-degree state in which the fixing support member 62 and the folding support member 63 are arranged in a straight line to a 0-degree state in which the fixing support member 62 and the folding support member 63 are arranged in parallel and overlapping with each other. When the mounting bracket 61 has a plate shape, the folding operation of the flexible member may be realized by performing a rotation from the 0-degree state in which the folding support member 63 is disposed above the fixing support member 62 and is arranged in parallel and overlapping with the fixing support member 62, to the 180-degree state in which the fixing support member 62 and the folding support member 63 are arranged in the straight line, and to a 360-degree state in which the folding support member 63 is disposed below the fixing support member 62 and is arranged in parallel and overlapping with the fixing support member 62.

The fixing support member 62 may include a fixing gear portion 621 coupled to the mounting bracket 61 via the first shaft such that the fixing gear portion 621 is capable of being rotated, and may include a fixing rod 622 that protrudes from the fixing gear portion 621. A fixing gear teeth for gear-coupling is formed on an outer circumferential surface of the fixing gear portion 621, and the fixing rod 622 is coupled to the fixing member 40.

The folding support member 63 may include a folding gear portion 631 coupled to the mounting bracket 61 via the second shaft such that the folding gear portion 631 is capable of being rotated, and may include a folding rod 632 that protrudes on the folding gear portion 631. A folding gear teeth engaged with the fixing gear teeth is formed on an outer circumferential surface of the folding gear portion 631, and the folding rod 632 is coupled to the folding member 50.

The folding mechanism according to an embodiment of the present disclosure may further include the jig attaching and detaching module 70. The jig attaching and detaching module 70 is configured to couple the jig module 30 to the base module 10 such that the jig module 30 is capable of being attached to and detached from the base module 10.

Figure 4:
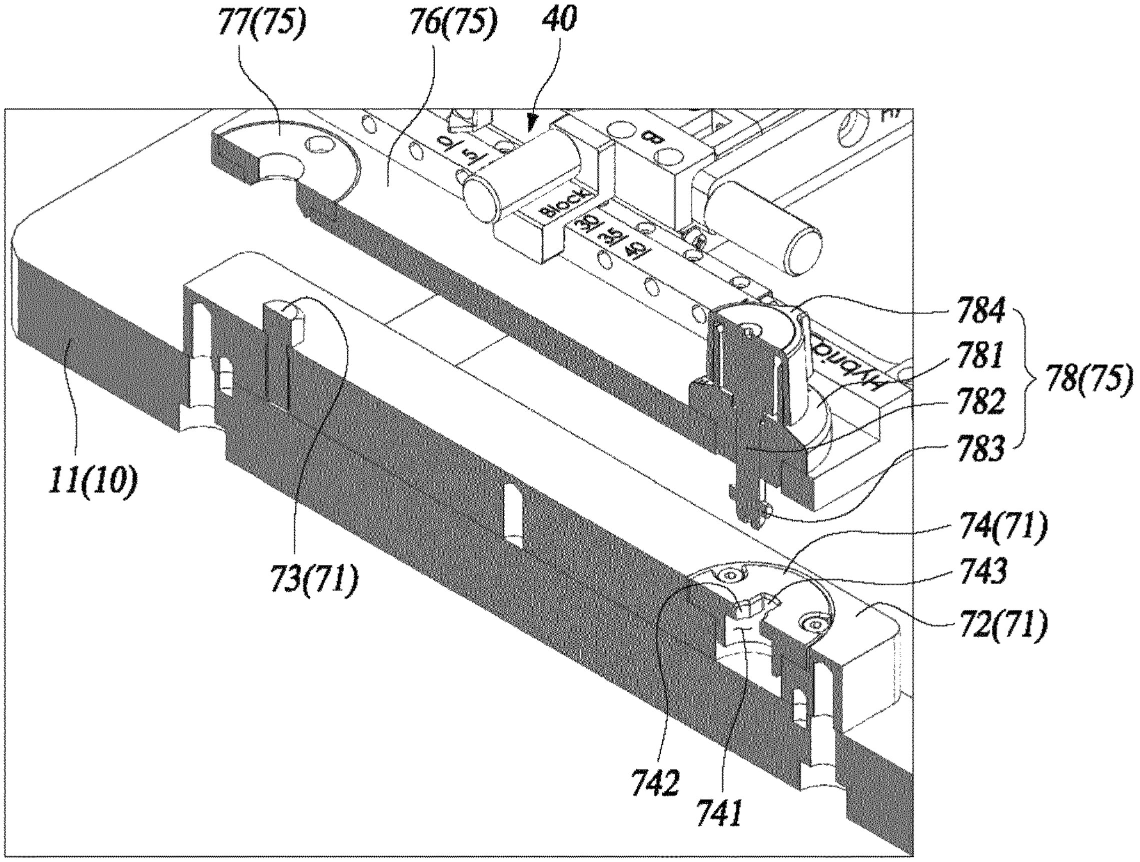
FIG. 4 is a view illustrating a detachable coupling between the base module and a jig module in the folding mechanism according to an embodiment of the present disclosure.
Figure 5:
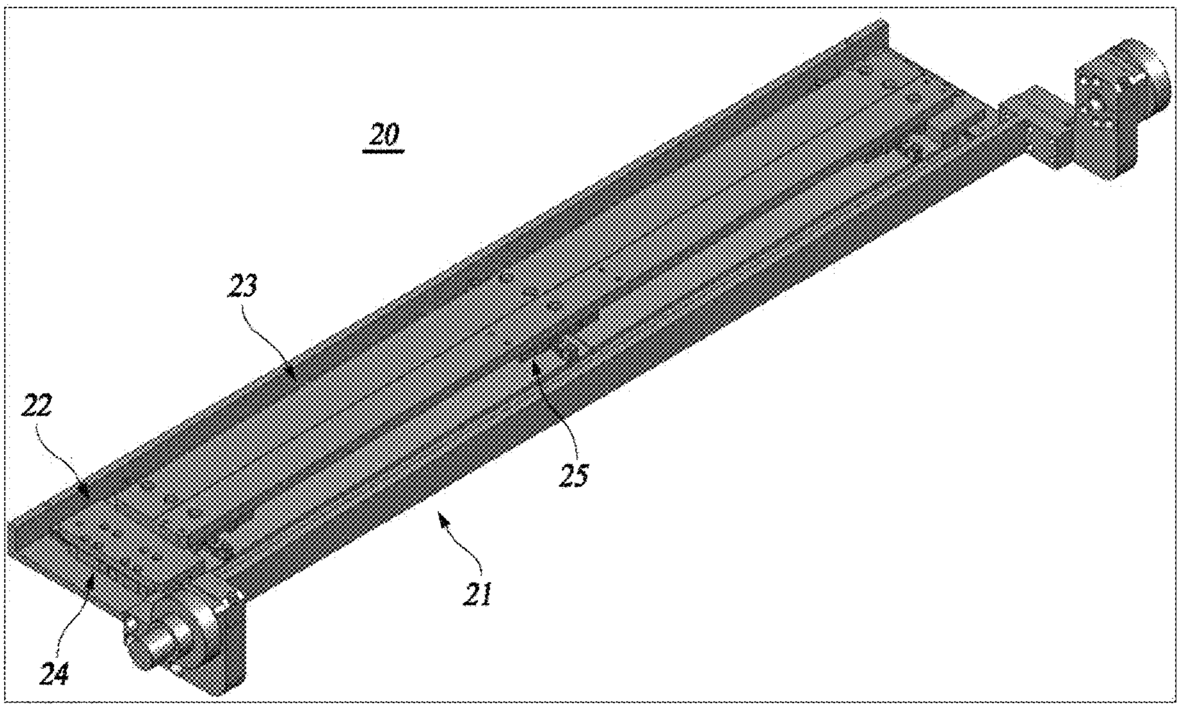
FIG. 5 is a perspective view illustrating a folding module in the folding mechanism according to an embodiment of the present disclosure.
Figure 6:
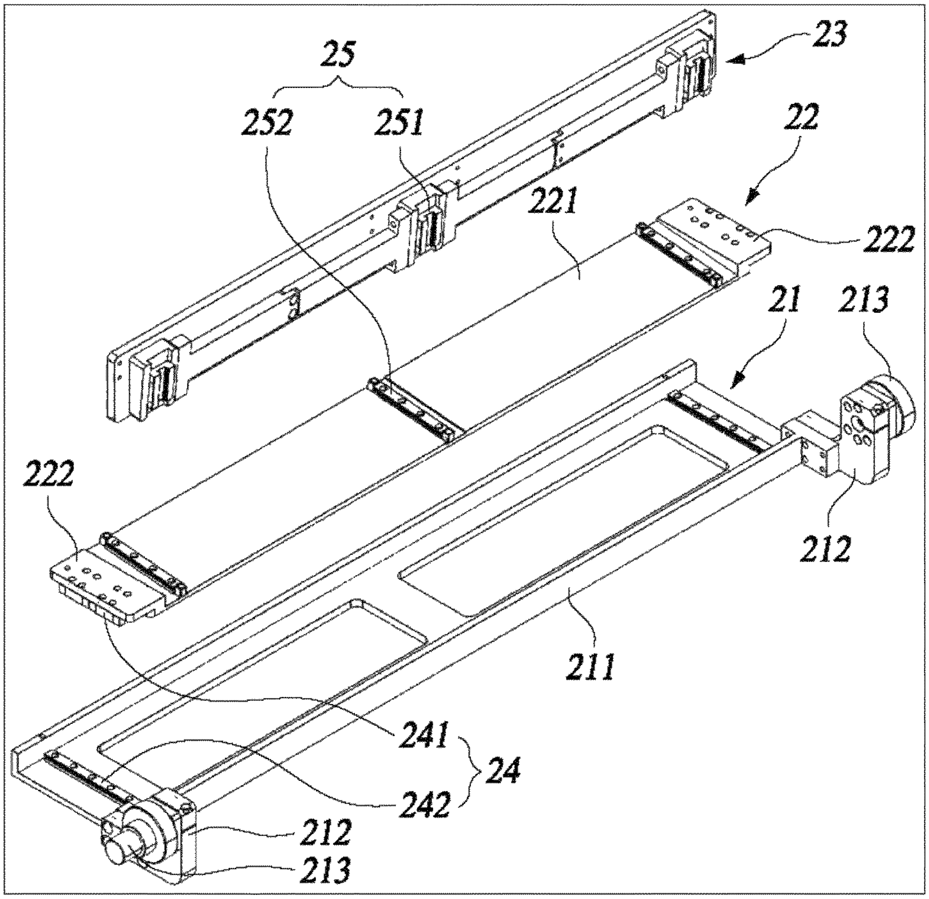
FIG. 6 is an exploded perspective view of FIG. 5.
Figure 7:
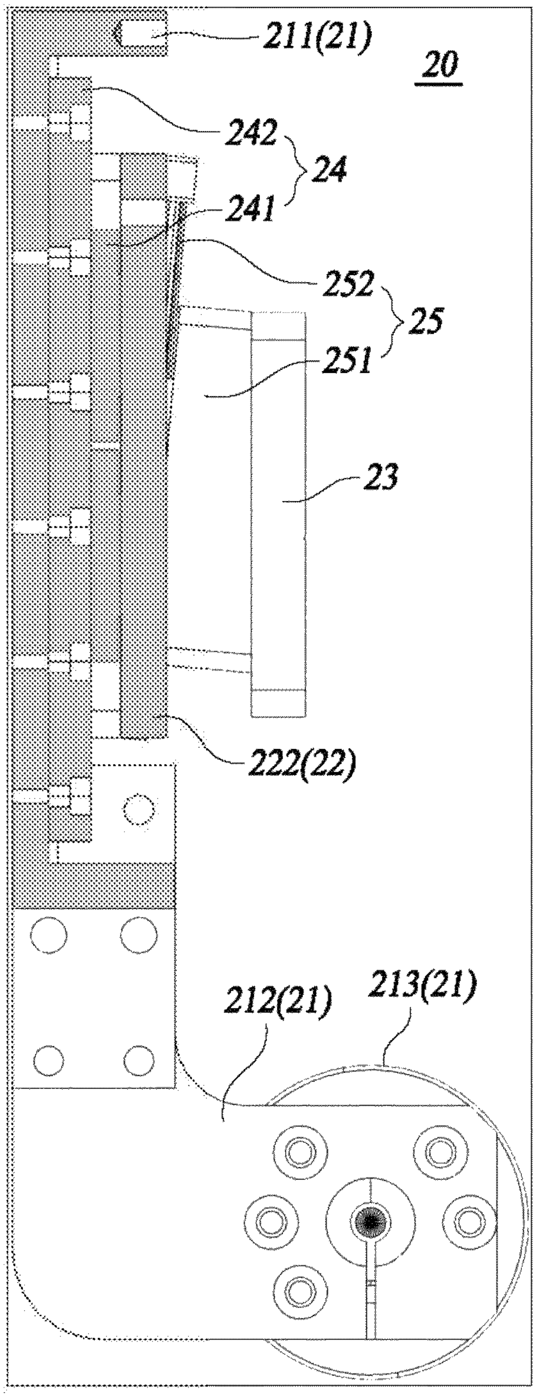
FIG. 7 is a first cross-sectional view illustrating a coupling relationship between a folding body and a first interlocking slider of the folding module in the folding mechanism according to an embodiment of the present disclosure.
Figure 8:
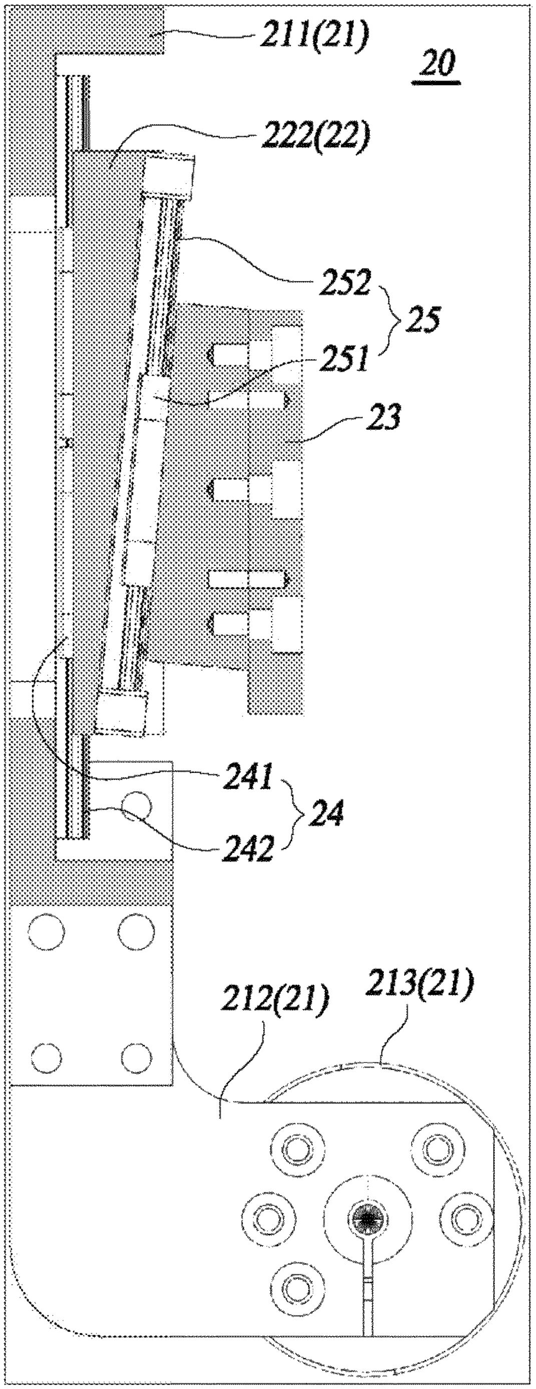
FIG. 8 is a second cross-sectional view illustrating a coupling relationship between the first interlocking slider and a second interlocking slider of the folding module in the folding mechanism according to an embodiment of the present disclosure.

More specifically, as illustrated in FIG. 4, the jig attaching and detaching module 70 may include a base attaching and detaching member 71 coupled and fixed to the base module 10, and may include a jig attaching and detaching member 75 which protrudes on the jig module 30 and which is coupled to the base attaching and detaching member 71 such that the jig attaching and detaching member 75 is capable of being attached to and detached from the base attaching and detaching member 71.

The base attaching and detaching member 71 may include a base support block 72 coupled and fixed to the base module 10, and may include a base attaching and detaching block 74 coupled and fixed to the base support block 72. At this time, a base support protrusion portion 73 may protrude on any one of the base support block 72 and a jig support block 76. The base support block 72 may be provided with a base mounting portion to which the base attaching and detaching block 74 and the base support protrusion portion 73 are coupled.

The base attaching and detaching block 74 may be provided with a locking flow space 741 in which a main shaft 782 and a locking shaft 783 flow, a main passage hole 742 formed through a middle portion of the base attaching and detaching block 74 such that the locking flow space 741 is in communication with an outside of the base attaching and detaching block 74, and a locking passage hole 743 recessed from an edge of the main passage hole 742 such that the locking flow space 741 is in communication with the outside of the base attaching and detaching block 74.

The jig attaching and detaching member 75 may include the jig support block 76 that protrudes on the jig module 30, and may include a jig attaching and detaching block 78 coupled to the jig support block 76 such that the jig attaching and detaching block is capable of being rotated and the jig attaching and detaching block 78 is capable of being attached to and detached from the base attaching and detaching block 74. At this time, a protrusion portion fitting portion fitted and coupled to the base support protrusion portion 73 may penetrate or be recessed in the other one of the base support block 72 and the jig support block 76. The jig support block 76 may be provided with a jig mounting portion to which the jig attaching and detaching block 78 and a jig fitting ring 77 having a protrusion portion fitting portion are coupled.

The jig attaching and detaching block 78 may include an attaching and detaching base 781 coupled and fixed to the jig support block 76 corresponding to the base attaching and detaching block 74, the main shaft 782 coupled to the attaching and detaching base 781 and the jig support block 76 such that the main shaft 782 is capable of being rotated and the main shaft 782 is capable of passing through the main passage hole 742, the locking shaft 783 that protrudes on the main shaft 782 such that the locking shaft 783 is capable of passing through the locking passage hole 743, and an attaching and detaching lever 784 coupled to the attaching and detaching base 781 such that the attaching and detaching lever 784 is capable of being rotated, the attaching and detaching lever 784 being configured to rotate the main shaft 782 such that the locking shaft 783 is capable of being locked on the base attaching and detaching block 74 in the locking flow space 741.

Accordingly, when the jig attaching and detaching module 70 is used, the jig module 30 is stacked and supported on the base module 10 while the jig attaching and detaching module 70 is in a state in which the main shaft 782 and the locking shaft 783 respectively face the main passage hole 742 and the locking passage hole 743 and the base support protrusion portion 73 faces the protrusion portion fitting portion of the jig fitting ring 77. Next, when the attaching and detaching lever 784 is rotated by 90 degrees, the locking shaft 783 is locked and supported on the base attaching and detaching block 74 in the locking flow space 741, so that the fixing member 40 of the jig module 30 may be coupled to the base module 10. In addition, the folding member 50 of the jig module 30 may be coupled to the second interlocking slider 23 of the folding module 20 by various known forms. Then, as illustrated in FIG. 1, the fixing member 40 and the folding member 50 are disposed in parallel, and indicate the 180-degree state.

In addition, the second side of the flexible material is supported on the folding member 50 of the jig module 30. In addition, the first side of the flexible material is coupled to the sliding base 46. Next, the sliding base 46 is slidably moved with respect to the fixing base 47, and then the sliding base 46 is coupled to the fixing base 47 by using the position adjustment member 49. Then, the first side of the flexible material is supported on the fixing member 40, and the flexible material is disposed flat on the jig module 30.

Figure 14:
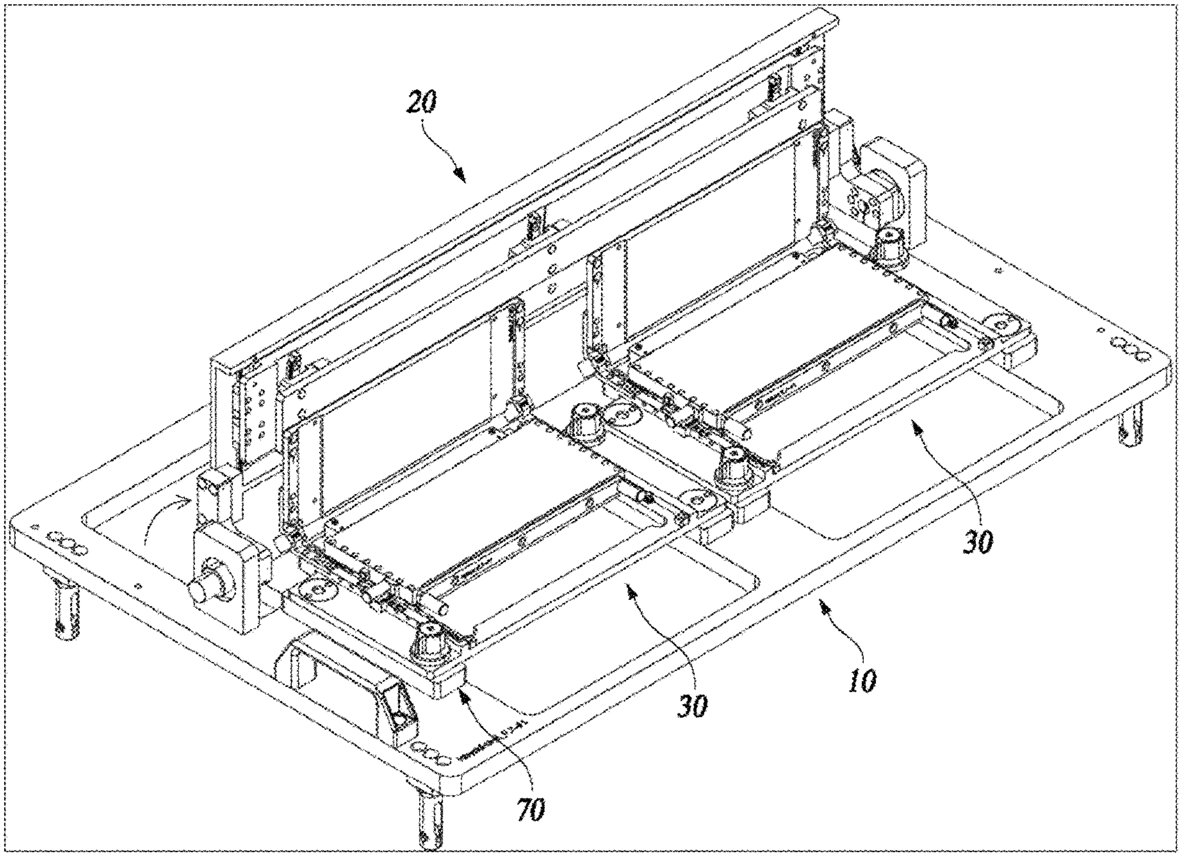
FIG. 14 is a perspective view illustrating a state in which the jig module is folded at 90 degrees by the folding module in the folding mechanism according to an embodiment of the present disclosure.
Figure 15:
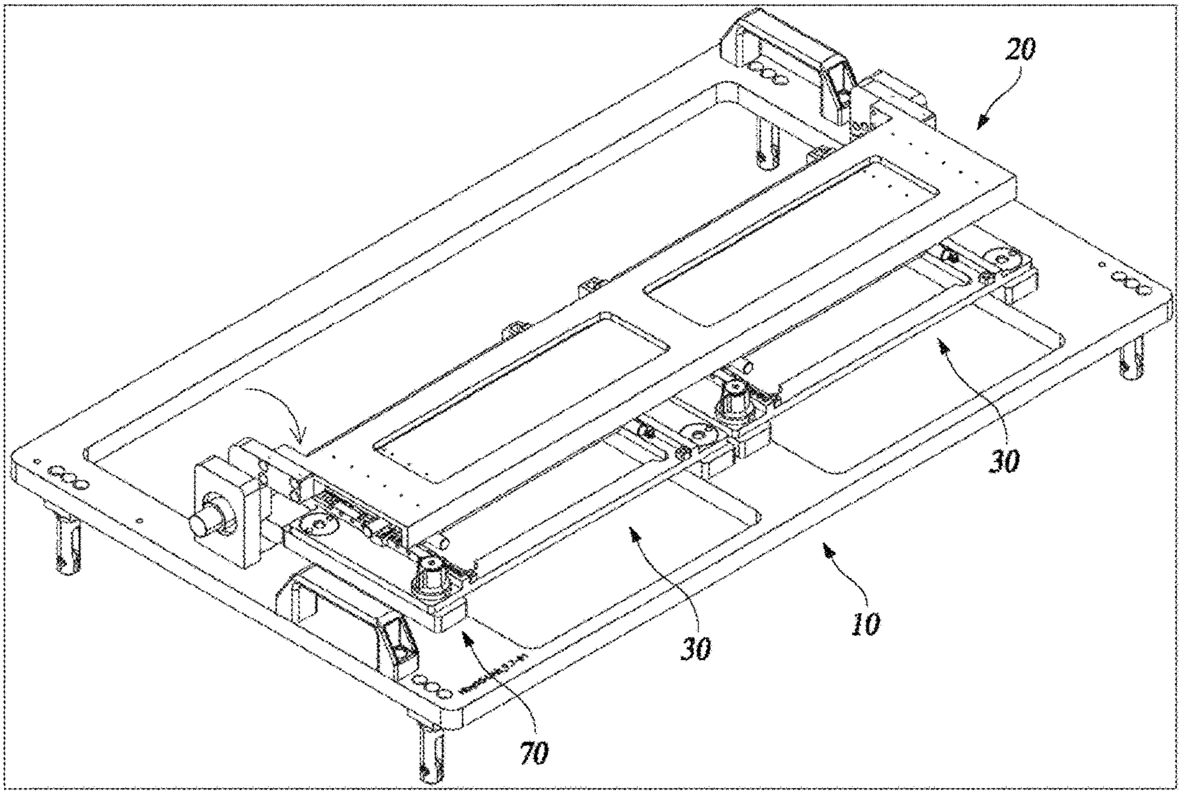
FIG. 15 is a perspective view illustrating a state in which the jig module is folded at zero degrees by the folding module in the folding mechanism according to an embodiment of the present disclosure.

In the 180-degree state in which the fixing member 40 and the folding member 50 are disposed in parallel as illustrated in FIG. 1, when the folding shaft 213 of the folding module 20 is rotated, the 90-degree state in which the folding member 50 is arranged at 90 degrees with respect to the fixing member 40 as illustrated in FIG. 14 is realized, and then the 0-degree state in which the fixing member 40 and the folding member 50 are arranged in parallel and overlapping with each other as illustrated in FIG. 15 is realized. At this time, as the folding member 50 is rotated with respect to the fixing member 40, the first interlocking slider 22 and the second interlocking slider 23 are interlocked and slidably moved with respect to the folding body 21, so that stress on the flexible material may be prevented.

According to the stress-free folding mechanism described above, in performing a folding test of the flexible material, the stress-free folding mechanism may be implemented to minimize stress acting on the flexible material that is folded, or to prevent stress acting on the flexible material that is folded.

In addition, the folding operation of the flexible material may be clearly realized.

In addition, when the folding operation of the flexible material is implemented, the folding operation is performed in a double sliding manner, and stress on the flexible material may be minimized.

In addition, when the flexible material is folded, a horizontal sliding method and an inclined sliding method are simultaneously used, so that an error between a movement trajectory of the flexible material and a movement trajectory of the second interlocking slider 23 may be corrected and stress may be prevented from occurring on the flexible material.

In addition, mounting of the flexible material may be smoothly performed, and the folding operation of the flexible material may be clearly realized.

In addition, the jig module 30 may be changed in various manners according to a type of the flexible material or a type of a test.

In addition, the jig module 30 may be conveniently attached to and detached from the base module 10.

In addition, as a forward rotation of the attaching and detaching lever 784 is performed, the locking shaft 783 is stably maintained in a state in which the locking shaft 783 is locked and coupled to the base attaching and detaching block 74. Furthermore, as a reverse rotation of the attaching and detaching lever 784 is performed such that the attaching and detaching lever 784 is returned to an original position, the jig attaching and detaching member 75 may be conveniently separated from the base attaching and detaching member 71.

In addition, a correct position of the jig attaching and detaching member 75 in the base attaching and detaching member 71 may be clarified.

In addition, the jig module 30 may be stably coupled to the base module 10 and the folding module 20, the folding operation of the flexible material may be clearly realized according to the operation of the folding module 20, and stress may be suppressed or prevented from being applied to the flexible material.

In addition, since the fixing member 40, the folding member 50 and the rotation support member 60 are rotated in conjunction with each other, stress acting on the flexible material may be suppressed or prevented.

In addition, various types of flexible materials may be coupled to a single jig module by slidably moving the sliding base 46 on the fixing base 47 according to a length of the flexible material.

In addition, a correct position of the sliding base 46 in the fixing base 47 may be conveniently fixed.

In addition, the coupling between the fixing base 47 and the sliding base 46 may be clarified according to a sliding position of the sliding base 46. In addition, since the position determination portion 492 is provided, a coupling position of the adjustment slider 493 may be clarified. In addition, since the position checking member 495 is provided, a position at which the sliding base 46 is slidably moved on the fixing base 47 may be visually and easily identified.

In addition, in the present disclosure, a linkage operation of the fixing member, the folding member, and the rotation support member is smoothly performed, and stress acting on the flexible material may be suppressed or prevented as the fixing member, the folding member, and the rotation support member are rotated in conjunction with each other.

In addition, the rotation of the mounting bracket 61, the fixing support member 62, and the folding support member 63 in conjunction with each other is clearly defined, and stress may be suppressed or prevented from being applied to the flexible material when the flexible material is folded.

What is claimed is:

1. A folding mechanism comprising:
- a base module; and
- a folding module which is coupled to the base module such that the folding module is capable of being rotated so as to realize a folding operation of a flexible material and to which the flexible material is coupled, wherein the folding module comprises:
- a folding body coupled to the base module such that the folding body is capable of being rotated;
- a first interlocking slider coupled to the folding body via a first interlocking member such that the first interlocking slider is capable of being slidably moved; and
- a second interlocking slider coupled to the first interlocking slider via a second interlocking member such that the second interlocking slider is capable of being slidably moved.

2. The folding mechanism of claim 1, wherein the first interlocking slider comprises:
- an inclined panel disposed to be inclined with respect to the folding body and coupled to the second interlocking slider via the second interlocking member such that the inclined panel is capable of being slidably moved; and a horizontal panel which extends from the inclined panel and which is disposed parallel to the folding body, the horizontal panel being coupled to the folding body via the first interlocking member such that the horizontal panel is capable of being slidably moved, and wherein the second interlocking slider is provided with an inclined support portion disposed parallel to the inclined panel.

3. The folding mechanism of claim 1, wherein the first interlocking slider comprises:

an inclined panel disposed to be inclined with respect to the second interlocking slider and coupled to the folding body via the second interlocking member such that the inclined panel is capable of being slidably moved; and a horizontal panel which extends from the inclined panel and which is disposed parallel to the second interlocking slider, the horizontal panel being coupled to the second interlocking slider via the first interlocking member such that the horizontal panel is capable of being slidably moved, and wherein the folding body is provided with an inclined support portion disposed parallel to the inclined panel.

4. The folding mechanism of claim 1, further comprising a jig module coupled to the folding module while the jig module is in a state in which the jig module is coupled to the base module such that the flexible material is mounted.

5. The folding mechanism of claim 4, further comprising a jig attaching and detaching module configured to couple the jig module to the base module such that the jig module is capable of being attached to and detached from the base module.

6. The folding mechanism of claim 5, wherein the jig attaching and detaching module comprises:

a base attaching and detaching member coupled and fixed to the base module; and a jig attaching and detaching member which protrudes on the jig module and which is coupled to the base attaching and detaching member such that the jig attaching and detaching member is capable of being attached to and detached from the base attaching and detaching member.

7. The folding mechanism of claim 6, wherein the base attaching and detaching member comprises:

a base support block coupled and fixed to the base module; and a base attaching and detaching block coupled and fixed to the base support block, wherein the base attaching and detaching block is provided with a locking flow space, a main passage hole is formed through a middle portion of the base attaching and detaching block such that the locking flow space is in communication with an outside of the base attaching and detaching block, and a locking passage hole is recessed from an edge of the main passage hole such that the locking flow space is in communication with the outside of the base attaching and detaching block, wherein the jig attaching and detaching member comprises:

a jig support block that protrudes on the jig module; and a jig attaching and detaching block coupled to the jig support block such that the jig attaching and detaching block is capable of being rotated and is capable of being attached to and detached from the base attaching and detaching block, and wherein the jig attaching and detaching block comprises:

an attaching and detaching base coupled and fixed to the jig support block corresponding to the base attaching and detaching block;

a main shaft coupled to the attaching and detaching base and the jig support block such that the main shaft is capable of being rotated and is capable of passing through the main passage hole;

a locking shaft that protrudes on the main shaft such that the locking shaft is capable of passing through the locking passage hole; and an attaching and detaching lever coupled to the attaching and detaching base such that the attaching and detaching lever is capable of being rotated, the attaching and detaching lever being configured to rotate the main shaft such that the locking shaft is capable of being locked on the base attaching and detaching block in the locking flow space.

8. The folding mechanism of claim 7, wherein a base support protrusion portion protrudes on any one of the base support block and the jig support block, and wherein a protrusion fitting portion coupled to the base support protrusion portion is formed in the other one of the base support block and the jig support block.

9. The folding mechanism of claim 4, wherein the jig module comprises:

a fixing member coupled to the base module such that a first side of the flexible material is supported;

a folding member spaced apart from the fixing member and coupled to the folding module such that a second side of the flexible material is supported; and a rotation support member configured to couple an end portion of the fixing member to an end portion of the folding member, the end portions being adjacent to each other.

10. The folding mechanism of claim 9, wherein the fixing member comprises:

a fixing base;

a sliding base coupled to the fixing base via a base interlocking member such that the sliding base is capable of being slidably moved.

11. The folding mechanism of claim 10, wherein the fixing member further comprises a position adjustment member configured to fix the sliding base to the fixing base such that the sliding base is disposed in a correct position.

12. The folding mechanism of claim 11, wherein the position adjustment member comprises:

an adjustment guide disposed adjacent to a side end portion of the sliding base and provided on the fixing base such that the adjustment guide is disposed parallel to the sliding base;

an adjustment slider coupled to the adjustment guide such that the adjustment slider is capable of being attached to and detached from the adjustment guide according to a position of the sliding base; and an adjustment coupling member configured to couple the adjustment slider to the side end portion of the sliding base such that the adjustment slider is capable of being attached to and detached from the side end portion of the sliding base.

13. The folding mechanism of claim 9, wherein the rotation support member comprises:

a first axis that forms a rotation center of the rotation support member with respect to the fixing member; and a second axis which is spaced apart from the first axis and which forms a rotation center of the folding member with respect to the rotation support member, and wherein the rotation support member is configured to be rotated with respect to the fixing member in conjunction with a rotation of the folding member with respect to the rotation support member when the folding member is folded with respect to the fixing member.

14. The folding mechanism of claim 13, wherein the rotation support member comprises:

a mounting bracket disposed between the fixing member and the folding member;

a fixing support member coupled to the fixing member and coupled to the mounting bracket via the first axis such that the fixing support member is capable of being rotated; and a folding support member coupled to the folding member and coupled to the mounting bracket via the second axis such that the folding support member is capable of being rotated, and wherein the fixing support member and the folding support member are gear-engaged with each other.

* * * * *